June 11, 1946.    G. M. DINNICK ET AL    2,402,029
ELECTRON DEVICE AND METHOD OF MANUFACTURE
Filed Aug. 29, 1942
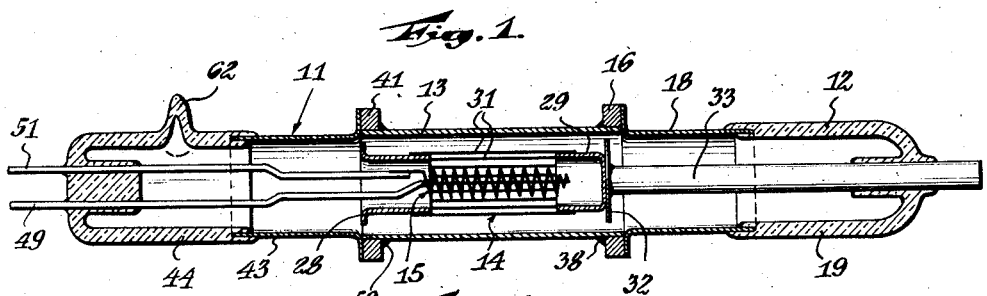
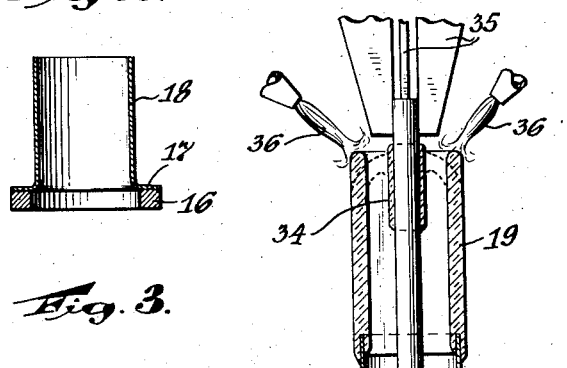
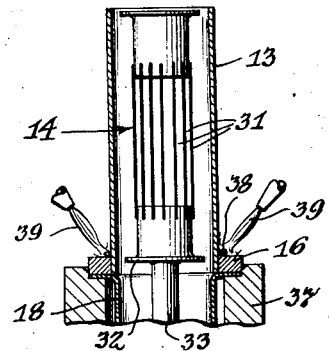
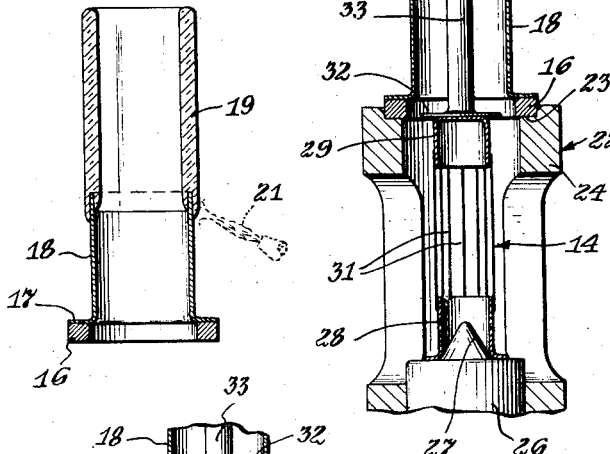
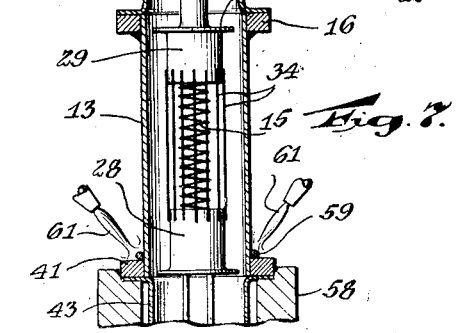
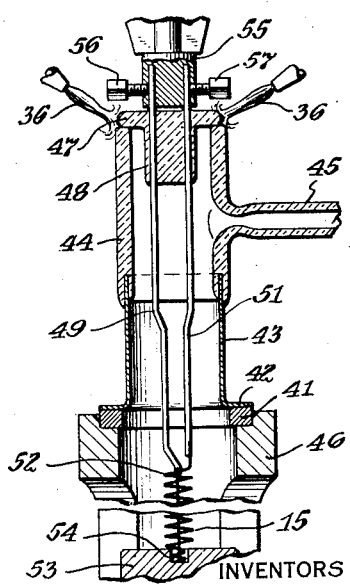
INVENTORS
G. M. DINNICK
L. C. WERNER
BY
ATTORNEY Patented June 11, 1946

2,402,029

UNITED STATES PATENT OFFICE 2,402,029

ELECTRON DEVICE AND METHOD OF MANUFACTURE

George M. Dinnick and Leo Carl Werner, Bloomfield, N. J., assignors to Westinghouse Electric Corporation, East Pittsburgh, Pa., a corporation of Pennsylvania Application August 29, 1942, Serial No. 456,604

18 Claims. (Cl. 250—27.5)

This invention relates to electron devices, methods of manufacture and, more particularly, to an improvement in the combined envelope and anode structure of such devices.

The principal object of our invention, generally considered, is to employ steel reenforcing rings and extensions of "Kovar," or other material of similar characteristics, with the hollow cylindrical copper anodes of certain electron devices, thereby avoiding the necessity of using copper feather-edge seals, in order to not only increase the strength of such devices but to facilitate accurate manufacture thereof.

Another object of our invention is the provision of electron devices in which the preferably copper anode member is connected to the glass portions of the envelope by means of graded seals consisting of steel rings and "Kovar" sleeves, thereby not only avoiding weak feather-edge copper-to-glass connections, but making it possible to facilitate accurate assembly by employing jigs.

A further object of our invention is to assemble the parts of an electron device by first welding a steel ring to a "Kovar" sleeve, then applying a glass sleeve to the free edge of said "Kovar" sleeve, sealing-in the grid support with respect to said sleeve, using a jig for holding the parts in proper relation with respect to one another during said sealing-in operation to form one end assembly, pre-assembling the filament and its supporting leads with respect to a glass member and uniting to a similar steel ring and "Kovar" and glass sleeve combination to form another end assembly, using a jig to keep the parts in proper relation with respect to one another during sealing, and then finally slipping the steel rings of said end assemblies over a copper anode-forming hollow cylinder and securing said rings to the cylinder by means of silver solder.

A still further object of our invention is to unite copper and "Kovar" by welding said "Kovar" to an intermediate steel member and connecting the copper to the steel member by means of silver solder.

Other objects and advantages of the invention, relating to the particular arrangement and construction of the various parts, will become apparent as the description proceeds.

In the drawing:

Fig. 1 is an axial sectional view of an electron device embodying our invention, but shown larger than it would normally be made.

Fig. 2 is a view of a "Kovar" sleeve and steel ring united as by projection welding, as the first step in the process of assembling the parts of the device.

Fig. 3 is a view of the assembled members of Fig. 2 in the process of being united to a glass sleeve.

Fig. 4 is an axial sectional view of a jig supporting an assembled grid and the parts of the envelope shown in Fig. 3, the outer end of the grid supporting lead being held in place by jaws and fires being shown in the process of uniting the outer end of the glass sleeve to glass beading on said grid lead.

Fig. 5 is a fragmentary axial sectional view of a jig supporting the parts assembled, as shown in Fig. 4, but reversed in position, with the steel ring slipped over or receiving one end of a hollow copper anode-forming member, and being united thereto by means of fires and silver solder.

Fig. 6 is a fragmentary axial sectional view of a jig supporting the parts of the envelope at the cathode end thereof in the process of uniting the cathode mount to the corresponding glass sleeve.

Fig. 7 is a view corresponding to Fig. 5 but showing the other end of the anode member being fitted in the steel ring forming part of the cathode assembly, and being secured thereto by means of silver solder.

Referring to the drawing in detail, Figure 1 shows a three-electrode device or tube 11 and consisting of an envelope 12 including an intermediate hollow cylindrical copper portion which forms the anode 13, and enclosing a grid 14 and a cathode 15.

The device of our invention is an improvement over three-electrode tubes in which the anode-forming part of the envelope is made as a hollow copper cylinder with sharp outer edges sealed directly to the glass members forming the end portions of said envelope, thereby avoiding not only the weak feather-edge connection between the copper and glass, but also the difficulty of getting the parts connected in proper relation with respect to one another.

A preferred method of uniting the parts of our improved device will now be described in detail.

In Figure 2 we have shown, as a first step in the process of forming the envelope, the connection of a steel ring 16 to an annular flange 17 formed on one end of a hollow cylindrical member 18 of "Kovar" or similar material. "Kovar" is the trade name of a nickel-cobalt-iron alloy consisting of from 28.7 to 29.2% Ni, from 17.3 to 17.8% Co, from 52.9 to 53.4% Fe, not more than .06% C, not more than .5% Mn, and not more than .2% Si, reference being made to the Scott Patent No. 2,062,335, and having a coefficient of expansion corresponding closely enough with that of glass to be used, that satisfactory seals therebetween may be effected. This union is desirably effected by projection welding, although we do not wish to be limited to this mode of connection.

In Figure 3 we have shown the next step in the process which consists in connecting a hollow cylindrical glass member 19 to the free edge of the "Kovar" member 18 as by means of fires 21.

Figure 4 shows the assembled parts, which are illustrated in Figure 3, supported on a jig 22, the steel ring 16 being received in a corresponding depression 23 in the upper end of the outer member 24 of said jig, and the assembled grid structure 14 centered and supported on the inner jig member 26, provided with an upstanding conical projection 27 over which the adjacent grid ring 28 accurately fits.

The grid assembly of the present embodiment consists of the grid cylinders 28 and 29 united by wires 31, the grid member 29 having one end closed, forming a cup, and connected to a disc 32 which is in turn connected to the grid supporting lead 33 which may be hollow and formed of "Kovar" or similar material. In order to facilitate assembly of the grid lead 33 with the glass sleeve 19, the same is desirably beaded with glass having the desired sealing characteristics, as indicated in 34. After the parts are assembled and supported by the jig members, as illustrated, with the upper end of the grid support held in position by jaws 35, fires 36 are used to melt the upper end of the glass sleeve 19, causing the same to draw in around and seal to the glass bead 34 on the grid lead 33.

The assembly produced, as illustrated in Figure 4, is then inverted and placed in a jig 37, which may be the outer member 24 of the jig 22 or one like it. A copper sleeve, or hollow cylindrical member adapted to function as the anode portion 13 of the device, is then fitted or telescoped in the steel ring 16 so that its lower end abuts or is disposed close to the "Kovar" member 18, whereupon it is then united to the steel ring 16 as by means of silver solder or the like 38, using fires 39 as illustrated in Fig. 5.

Figure 6 illustrates the parts of the envelope at the cathode end thereof during the process of assembly. As in connection with the grid end of the device, the cathode end consists of a steel ring 41 to which the flange 42 of a preferably "Kovar" sleeve 43 is desirably connected by means of projection welding, as in the preceding instance. To the free edge of the sleeve 43 is sealed a glass sleeve 44 which may correspond with the sleeve 19 except it has an exhaust tube 45 forming a part thereof. To the free edge of the glass sleeve 44, after the assembled structure is supported in a jig 46 which may correspond with the portion 24 of the jig 22, is secured the flange 47 of a glass element 48 through which the leads 49 and 51 of the filamentary cathode 52 for the device extend. An inner jig portion 53, with upwardly opening pocket 54, serves to properly center the cathode 52 with respect to the associated parts. The upper end of the cathode assembly is held in proper position by means of the supporting device 55, receiving the upstanding outer end portions of the leads 49 and 51 which are clamped in position as by means of set screws 56 and 57.

After sealing of the flange portion 47 to the glass part 44, the assembly is desirably reversed and supported by a jig 58, as shown in Figure 7, which jig may correspond with the outer member 24 of the jig 22. When in this position the grid assembly, as illustrated in Figure 5, is then reversed and brought down so that the free edge of the hollow copper anode-forming portion 13 fits in the steel ring 41, whereupon said anode and ring are united by means of silver solder or the like 59 using fires 61.

After the parts are fully assembled, as described, the envelope may be exhausted through the tube 45 and tipped off as indicated at 62.

Inasmuch as "Kovar" has a coefficient of expansion of about $4 \times 10^{-6}$, steel a coefficient of expansion of about $10 \times 10^{-6}$, and copper a coefficient of expansion of about $17 \times 10^{-6}$, the steel forms a proper graded seal between the two other metals. It will, however, be understood that we do not wish to be limited to this specific, although preferred, combination of metals for effecting such a seal.

In view of the foregoing disclosure it will be seen that we have provided means: to pre-align critical tube parts before assembly; to make a strong assembly or one that is not easily broken; and to keep glass working at a minimum. We have also provided means to assemble parts of an electron device without oxidizing, and means to remove heat from the center of the tube without affecting the metal-to-glass seals. It will also be seen that, by virtue of our invention, mechanical alignment of the parts may be effected, with the accuracy depending on machine fits rather than glass working.

In making our assembly of the parts of the structure, heating may be done in a hydrogen or other protective gas atmosphere so that undesirable oxidation will not occur. A blast of cooling gas or liquid may be directed against the "Kovar" parts 18 and 43 when the copper anode member 13 is heated to melt the solder, so that the said "Kovar" parts and connected glass portions do not become too hot. This procedure keeps the inside of the tube clean. As soon as the tube is finally soldered, as shown in Figure 7, the vacuum pump is desirably attached to the exhaust tube 45 and started so that by the time the tube is cool, it is completely evacuated. This procedure helps considerably to reduce the time required to finish the device.

By virtue of our invention it is possible to make the small electron devices contemplated with tolerances as low as .0005". That is, the spacing between the cathode filament and grid may be as close as .002"±.0005", for example. Using the method disclosed, the welding operations may be performed without danger to glass-to-metal seals. Because of its small size, it is not believed that such devices could be commercially manufactured except by following our invention.

Although preferred embodiments of our invention have been disclosed, it will be understood that modifications may be made within the spirit and scope of the appended claims.

We claim:

1. An electron device comprising an envelope consisting of a hollow cylindrical metal member, reinforcing rings connected to the ends thereof, metal extensions connected to said rings, glass envelope end portions united to and closing the ends of said extensions, a grid support extending through one of said glass end portions, and filament support leads extending through the other.

2. An electron device comprising an envelope consisting of a hollow copper cylinder, reinforcing steel rings soldered to the ends thereof, hollow nickel-cobalt-iron alloy cylindrical members with outstanding flanges welded to the outer annular surfaces of said rings, glass envelope end portions united to and closing the ends of said extensions, and a grid support sealed through one of said glass end portions and filament support leads sealed through the other.

3. The method of making an electron device comprising securing a reinforcing ring to an outstanding flange on a hollow cylindrical member, sealing one end of a hollow cylindrical glass sleeve to the free end of said member, sealing a grid supporting lead through the free end portion of said glass sleeve, making a similar assembly between a reinforcing ring, hollow cylindrical member and glass sleeve for the other end of said device, sealing cathode leads through said last-mentioned glass sleeve portion, fitting the rings of said end assemblies over the end portions of a conductive tube adapted to function as an anode, and soldering said rings to said tube.

4. The method of making an electron device comprising securing a steel ring to an outstanding flange on a hollow cylindrical nickel-cobalt-iron alloy member, sealing the other end of said alloy member to a hollow cylindrical glass sleeve, making a similar assembly for the other end portion of said device, sealing the supporting lead of a grid through the free end portion of one of the glass sleeves, sealing cathode leads through the free end portion of the other glass sleeve, fitting the steel rings of said assembly over the end portions of a copper tube adapted to function as an anode, and soldering said rings to said copper tube.

5. The method of making an electron device comprising securing a reinforcing ring to a hollow cylindrical member, sealing the free end of said cylindrical member to an end of a hollow cylindrical glass sleeve, supporting said assembly in a jig, assembling a grid with respect to a lead-in conductor, supporting said grid with said lead-in conductor upstanding and centered with respect to said jig-supported assembly, heating the upper end portion of said hollow cylindrical glass sleeve until it seals around said upstanding grid lead, uniting a cathode assembly with supporting lead-in conductor to a similar assembly to produce the other end portion of said device, supporting one of said assemblies in a jig, fitting an end of a hollow metal tube within the assembly reinforcing ring, soldering said end in place in said ring, fitting the other assembly in a jig, fitting the other end of said tube into the reinforcing ring of said jig-supported assembly, and soldering said tube in place in said ring.

6. The method of uniting cylindrical members of copper and nickel-cobalt-iron alloy comprising, first welding said alloy member to an intermediate steel ring in a plane transverse to the axis of the tube, and then telescoping said copper member in, and soldering it to, said steel ring along the contacting cylindrical surfaces of the telescoped members.

7. The method of uniting tubes of copper and nickel-cobalt-iron alloy comprising flanging one end of said alloy tube, then welding a steel ring to said flange, telescoping one end portion of said copper tube within said ring, and finally silver-soldering said ring to said copper tube.

8. An electron device with an envelope comprising a hollow metal member, reinforcing rings connected to the ends thereof, metal extensions connected to said rings and glass envelope end portions united to and closing the outer end of said extensions.

9. An electron device comprising a hollow intermediate metal member, members formed of a metal different from, and connected to the ends of, said intermediate member, glass envelope portions united to and closing the outer ends of said end-connected members, a grid support extending through one of said glass end portions, and filament support leads extending through the other.

10. An electron device with an envelope comprising a hollow copper member, a reinforcing steel ring secured to an end thereof, and a hollow member secured to said ring, said member being formed of material which satisfactorily seals to glass, and a glass envelope end portion closing the outer end of said last-mentioned member.

11. An electron device comprising an envelope consisting of an intermediate hollow copper member, hollow members formed of metal readily sealable to glass and secured to the ends of said copper member, and glass envelope end portions united to and closing the ends of said metal end-connected members.

12. The method of making an electron device comprising securing a reinforcing ring to an outstanding flange of a hollow member, sealing one end of a hollow glass sleeve to the free end of said member, sealing an electrode supporting lead through the free end portion of said glass sleeve, and fitting a conductive tube inside of, and securing it to, said ring.

13. The method of making an electron device comprising securing a reinforcing ring to an outstanding flange of a hollow cylindrical member, sealing one end of a hollow cylindrical glass sleeve to the free end of said member, sealing lead means through said glass sleeve portion, telescoping the ring over the end portion of a conductive tube, and soldering said ring to said tube.

14. The method of making an electron device comprising securing a steel ring to an outstanding flange on a hollow cylindrical alloy member, sealing the other end of said alloy member to a hollow cylindrical sleeve of glass having a corresponding coefficient of expansion, telescoping the steel ring over the end portion of a copper anode tube, and soldering said ring to said tube.

15. The method of making an electron device comprising securing a steel ring to an outstanding flange on a hollow cylindrical nickel-cobalt-iron alloy member, sealing the other end of said alloy member to a hollow cylindrical sleeve of glass of a corresponding coefficient of expansion, sealing lead means through the free end portion of said glass sleeve, fitting the steel ring over an end portion of a copper anode tube, and soldering said ring to said tube.

16. The method of making an electron device comprising securing a reinforcing ring to a hollow cylindrical member, sealing the free end of said cylindrical member to an end of a hollow cylindrical glass sleeve, supporting said assembly in a jig, assembling an electrode with a lead-in conductor, supporting said electrode with said lead-in conductor upstanding and centered with respect to said jig-supported assembly, heating the upper end portion of said hollow cylindrical glass sleeve until it seals around said lead, fitting an end of a tube into said reinforcing ring, and soldering said tube in place in said ring.

17. The method of making an electron device comprising securing a reinforcing ring to hollow cylindrical member, sealing the free end of said cylindrical member to an end of a hollow cylindrical glass sleeve, sealing the free end portion of said glass sleeve, making another similar assembly, supporting one of said assemblies in a jig, fitting an end of a hollow metal tube within the supported assembly reinforcing ring, securing said end in place in said ring, fitting the other assembly in a jig, fitting the other end of said tube into the reinforcing ring of said jig-supported assembly, and securing said tube in place in said ring.

18. An assembly for an electron device comprising a hollow copper member, a steel ring in which said copper member telescopes and is soldered, a hollow member welded to said ring and formed of metal which satisfactorily seals to glass, and a glass envelope portion to which said last-mentioned member is sealed.

GEORGE M. DINNICK.
LEO C. WERNER.